United States Patent [19]

Mannherz

[11] Patent Number: 4,592,886
[45] Date of Patent: Jun. 3, 1986

[54] TECHNIQUE FOR STABILIZING INJECTION MOLDED FLOWMETER LINER

[75] Inventor: Elmer D. Mannherz, Southampton, Pa.

[73] Assignee: Fischer & Porter, Warminster, Pa.

[21] Appl. No.: 372,717

[22] Filed: Apr. 28, 1982

[51] Int. Cl.[4] .......................................... B32B 31/06
[52] U.S. Cl. .................................. 264/262; 264/255; 264/261; 264/263
[58] Field of Search ................ 264/261, 262, 263, 255

[56] References Cited

U.S. PATENT DOCUMENTS

| | | | |
|---|---|---|---|
| 2,288,661 | 7/1942 | Wadman | 264/86 |
| 2,803,043 | 8/1957 | Stephens | 425/812 |
| 3,061,887 | 11/1962 | Clarke | 264/262 |
| 4,104,354 | 8/1978 | Hubbard | 264/262 |
| 4,171,560 | 10/1979 | Garrett | 264/262 |

Primary Examiner—Donald Czaja
Assistant Examiner—Mary Lynn Fertig
Attorney, Agent, or Firm—Michael Ebert

[57] ABSTRACT

A technique for stabilizing an insulating liner formed of thermoplastic material which is injection molded onto the inner surface of a metal spool having a cylindrical body provided with end flanges, an annular gap being created between the liner and the spool body due to differential shrinkage between the liner and the body as the molded liner cools and solidifies. In order to fill this gap to prevent a change in the inner diameter of the liner when the liner is subjected to the pressure of a fluid flowing therethrough, the spool body is provided with ports which extend between the exterior and interior surfaces thereof. These ports are sealed during the injection-molding process by removable plugs. After injection-molding, the plugs are removed and a thermosetting resin is introduced into one of the ports until the gap is filled as evidenced by the fact that the resin begins to rise in the other ports, the resin then being cured to solidify the filler.

2 Claims, 4 Drawing Figures

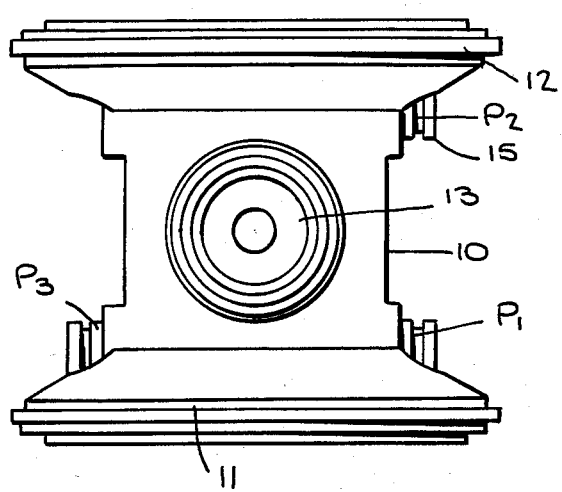
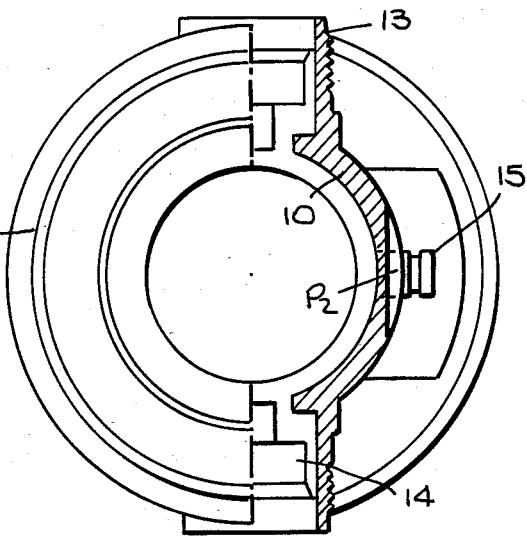
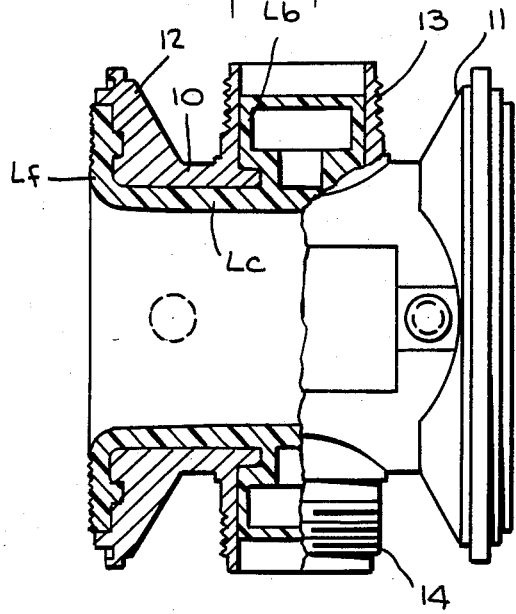
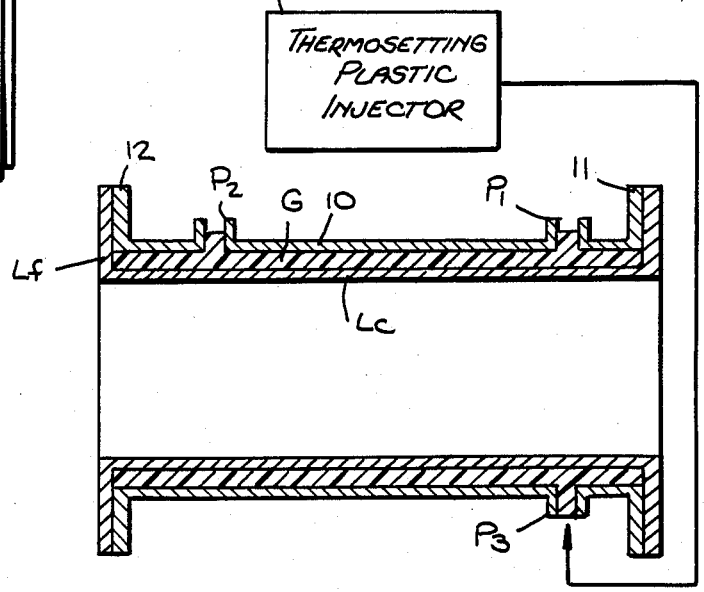

TECHNIQUE FOR STABILIZING INJECTION MOLDED FLOWMETER LINER

RELATED APPLICATION

This application is related to a copending application Ser. No. 368,410, filed Apr. 14, 1982, of Davis and Mannherz, entitled "Technique for Injection-Molding a Liner Onto a Metal Spool," now U.S. Pat. No. 4,403,933.

BACKGROUND OF INVENTION

This invention relates generally to electromagnetic flowmeters, and in particular to a technique for stabilizing an insulating liner formed of thermoplastic material and injection-molded onto the inner surface of a metal spool having a cylindrical body provided with end flanges, the lined metal spool being incorporated into a flowmeter to define a flow conduit for the fluid being metered.

Magnetic flowmeters such as those disclosed in U.S. Pat. Nos. 3,695,104; 3,824,856; 3,783,687 and 3,965,783 are especially adapted to measure the volumetric flow rates of fluids which present difficult handling problems, such as corrosive acids, sewage and slurries. Because the instrument is free of flow obstructions, it does not tend to plug or foul. The flowmeter can be used to meter liquids without regard to heterogeneous consistency.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

In order to provide a compact and readily installable electromagnetic flowmeter whose weight and dimensions are substantially smaller than existing types, the Schmoock U.S. Pat. Nos. 4,253,340 and 4,214,477 disclose a highly compact flowmeter which, in spite of its reduced volume and weight, is capable of withstanding high fluid pressures. In the Schmoock flowmeter, use is made of a non-magnetic metal spool of high strength whose inner surface is lined with insulating material to define a flow conduit for the fluid to be metered, the spool having a cylindrical body with end flanges at either end and a pair of diametrically-opposed bosses midway between the end flanges to receive the meter electrodes.

The metal spool also serves to withstand fluid pressure as well as the compressive forces to which the meter is subjected by bolts bridging the flanged ends of upstream and downstream pipes between which the unit is interposed.

Surrounding the Schmoock spool and concentric therewith is a cylindrical housing formed of ferromagnetic material. The housing is provided with annular end plates that are joined to the corresponding end flanges of the spool to define an inner chamber. Integral with the housing are two magnet cores which are placed at diametrically-opposed positions along an axis which is normal to the longitudinal axis of the housing, coils being wound on these cores. A pair of electrodes are mounted on the spool at diametrically-opposed positions along a transverse axis at right angles to the core axis. The inner chamber is filled with a potting compound to encapsulate the electromagnets and the electrodes, the housing serving as a mold for this purpose.

Insulating liners for electromagnetic flowmeters are usually molded of fluorocarbon materials such as PTFE, PFA and FEP. Because fluorocarbons are non-reactive with virtually all corrosive fluids, they have properties appropriate to liners for flowmeters. When injection-molding plastic liners into the body of metal spools of the type included in flowmeters disclosed in the Schmoock patents, certain problems are encountered, particularly when the thermoplastic material used to form the liner is of the type having reinforcing fibers therein.

In order to solve this problem, the above-identified related patent application whose entire disclosure is incorporated herein by reference, discloses an injection-molding technique in which the metal spool is supported within a mold which defines a liner cavity conforming to the inner surface of the cylindrical body and to the faces of the end flanges, the liner cavity communicating with cavities conforming to the inner surface of the electrode bosses. When the mold cavities are filled with molten thermoplastic material which then cools and solidifies the resultant liner conforms to the body and flanges of the spool and also to the inner surface of the electrode bosses.

While the injection-molding technique disclosed in the copending application tends to reduce shrinkage in the direction of the spool axis and thereby prevent the liner flanges from pulling away, an annular gap is developed between the liner and the cylindrical spool body. This gap is created because of the differential shrinkage between the liner and spool body as the thermoplastic material cools and solidifies.

As a consequence of this gap, fluid to be metered which flows through the liner may exert a pressure thereon sufficient to cause the liner to expand into the free space. Thus the internal diameter of the liner may be caused to vary as a function of the internal fluid pressure, this resulting in calibration shifts and possibly in liner rupture should the expansion of the liner exceed the physical limits of the material.

SUMMARY OF INVENTION

In view of the foregoing, the main object of this invention is to provide a technique for stabilizing an insulation liner of thermoplastic material injection-molded into the cylindrical body of a metal spool which is to be included in an electromagnetic flowmeter.

More particularly, an object of this invention is to provide a technique for filling in the annular gap created between the injection-molded liner and the body of the spool with a thermosetting resin whereby the liner has an internal diameter which remains constant under varying conditions of fluid pressure, to obviate calibration shifts and possible liner rupture.

Also an object of this invention is to provide a technique of the above type which is cost-effective and which results in an electromagnetic flowmeter whose operation is reliable and efficient.

Briefly stated, these objects are accomplished by a technique for stabilizing an insulating liner formed of thermoplastic material which is injection molded onto the inner surface of a metal spool having a cylindrical body provided with end flanges, an annular gap being created between the liner and the spool body due to differential shrinkage between the liner and the spool body due to differential shrinkage between the liner and the body as the molded liner cools and solidifies. In order to fill this gap and to bond the liner to the body surface to prevent a change in the inner diameter of the liner when the liner is subjected to the pressure of a fluid flowing therethrough, the spool body is provided with ports which extend between the exterior and interior surfaces thereof. These ports are sealed during the injection-molding process by removable plugs. After injection-molding, the plugs are removed and a thermosetting resin is introduced into one of the ports until the gap is filled as evidenced by the fact that the resin begins to rise in the other ports, the resin then being cured to solidify the filler.

OUTLINE OF THE DRAWINGS

For a better understanding of the invention as well as other objects and further features thereof, reference is made to the following detailed description to be read in conjunction with the accompanying drawings, wherein:

FIG. 1 is a top view of a metal spool for a flowmeter which includes ports making it possible to carry out a technique in accordance with the invention;

FIG. 2 is an end view of the spool, partly in section;

FIG. 3 is an elevational view of the spool, partly in section to expose the liner; and FIG. 4 is a sketch illustrating the technique.

DESCRIPTION OF INVENTION

Referring now to FIGS. 1, 2 and 3, there is shown a metal spool for inclusion in an electromagnetic flowmeter onto which a thermoplastic liner has been injection-molded by the technique disclosed in the above-identified copending application.

The spool is constituted by a cylindrical body 10 having flanges 11 and 12 at either end. A pair of bosses 13 and 14 is disposed at diametrically-opposed positions in the spool body midway between the end flanges, the bosses being adapted to receive the meter electrodes. The liner is constituted by a cylindrical portion $L_c$ which conforms to the inner surface of spool body 10, flange portions $L_f$ which conform to the faces of the end flanges, and boss portions $L_b$ conforming to the inner surface of electrode bosses 13 and 14.

While ideally the injection-molded liner should abut the inner surface of the spool body, in practice, as pointed out previously, a gap is developed therebetween as a result of shrinkage taking place during the course of cooling and solidification.

In order to fill this gap and thereby stabilize the liner, the metal spool is provided with three ports $P_1$, $P_2$ and $P_3$ each sealed by a removable plug 15. As shown in FIG. 2, each port or hole extends from the exterior of the spool body to the interior thereof, the port thereby communicating with the annular gap G (see FIG. 4) created between the liner portion $L_c$ and the cylindrical spool body 10.

Ports $P_1$ and $P_2$ are located adjacent opposite flanged ends of the spool body on one side thereof, whereas port $P_3$ is located on the opposite side of this spool body in line with port $P_2$. The sealing plugs 15 protrude slightly into the internal diameter of the metal spool to prevent the ports from filling with molten liner material during injection molding of the liner.

It is to be noted that the body of the metal spool has a slight taper or flare extending from its center to either end, so that the internal diameter of the body is slightly greater at the ends than at the center. When injection-molding is carried out to fabricate the liner, the port plugs 15 are in place so that the ports do not interfere with injection-molding. After the spool is taken out of the mold, the plugs are removed and the spool is then supported horizontally in the manner shown in FIG. 4 with ports $P_1$ and $P_2$ at the top and port $P_3$ at the bottom A thermosetting molding material provided by a source 16 is then introduced into lower port $P_3$, the material acting to fill the annular gap G between liner portion $L_c$ and metal spool body 10. The upper ports $P_1$ and $P_2$ serve to permit the escape of air from the gap as the air is displaced by the thermosetting material.

Since the spool body has a double-tapered internal formation, the smaller diameter being at the center, when the operator sees the thermosetting material beginning to rise within the end ports $P_1$ and $P_2$ at the top, he then knows the gap is completely filled and he cuts off further supply. The filler plastic is then permitted to cure and solidify to close the gap and lock the liner to the spool body.

The thermosetting plastic used as a filler is preferably one in the epoxy family which cures at room temperature to prevent differential shrinkage from occurring during the cure cycle, for this would result in the formation of additional gaps. A preferred epoxy resin for this purpose is a two component epoxy "Eccoseal W-19" marketed by Emerson and Cuming of Canton, Ma.

While there have been shown and described preferred embodiments of a technique for stabilizing injection molded flowmeter liner in accordance with the invention, it will be appreciated that many changes and modifications may be made therein without, however, departing from the essential spirit thereof.

I claim:

1. A method for producing a stabilized insulating liner in a flowmeter comprising the steps of first injection molding a thermoplastic material onto the inner surface of a metal spool having a cylindrical body provided with end flanges, said spool being provided with first and second ports placed on one side of the body adjacent the end flanges thereof and a third port on the opposite side of the body, the lined spool being adapted to conduct a pressurized fluid, a gap being created between the liner and the body due to differential shrinkage as the injection-molded thermoplastic liner cools and solidifies, the method further comprising the steps:

A. supporting the lined spool in a horizontal position with the third port on the bottom;

B. introducing a thermosetting resin curable at room temperature into the gap through the third port in the spool body to fill the gap therewith, the presence of resin in the first and second ports being indicative of the filled state, said resin not being subject to differential shrinkage during curing; and C. curing the resin to form a filler in the gap to thereby maintain the internal diameter of the liner at a constant value regardless of varying fluid pressure.

2. A method as set forth in claim 1 wherein said resin is a two-component epoxy.

* * * * *